United States Patent [19]

Pamer

[11] 3,809,382

[45] May 7, 1974

[54] FLUID THRUST DEVICE

[75] Inventor: Karl A. Pamer, Chagrin Falls, Ohio

[73] Assignee: McNeil Corporation, Wickliffe, Ohio

[22] Filed: June 9, 1972

[21] Appl. No.: 261,377

[52] U.S. Cl. .............................. 267/65 A, 104/123
[51] Int. Cl. ............................................ B60g 11/26
[58] Field of Search.......... 267/122, 152, 153, 65 R, 267/65 A; 248/49, 54; 104/89, 91, 106, 111, 112, 115, 123, 24, 25; 105/148, 150, 154, 155, 453

[56] References Cited
UNITED STATES PATENTS

| | | |
|---|---|---|
| 3,154,273 | 10/1964 | Paulsen .............................. 267/122 |
| 3,290,056 | 12/1966 | Smith ................................ 105/453 |
| 2,088,430 | 7/1937 | Nelles ................................ 104/123 |
| 3,064,585 | 11/1962 | Ewing ................................ 105/154 |
| 3,095,174 | 6/1963 | Dehn ................................. 104/111 |
| 2,241,409 | 5/1941 | Mason ............................... 267/153 |
| 3,580,560 | 5/1971 | Jarret ................................ 267/153 |
| 1,634,895 | 7/1927 | Amory ............................. 267/65 A |
| 2,966,366 | 12/1960 | Moulton ......................... 267/65 A |

Primary Examiner—M. Henson Wood, Jr.
Assistant Examiner—D. W. Keen
Attorney, Agent, or Firm—Watts, Hoffman, Fisher & Heinke

[57] ABSTRACT

A thrust device comprising a discrete, entirely resilient and flexible, closed vessel filled with liquid.

7 Claims, 4 Drawing Figures

PATENTED MAY 7 1974
3,809,382
SHEET 2 OF 2
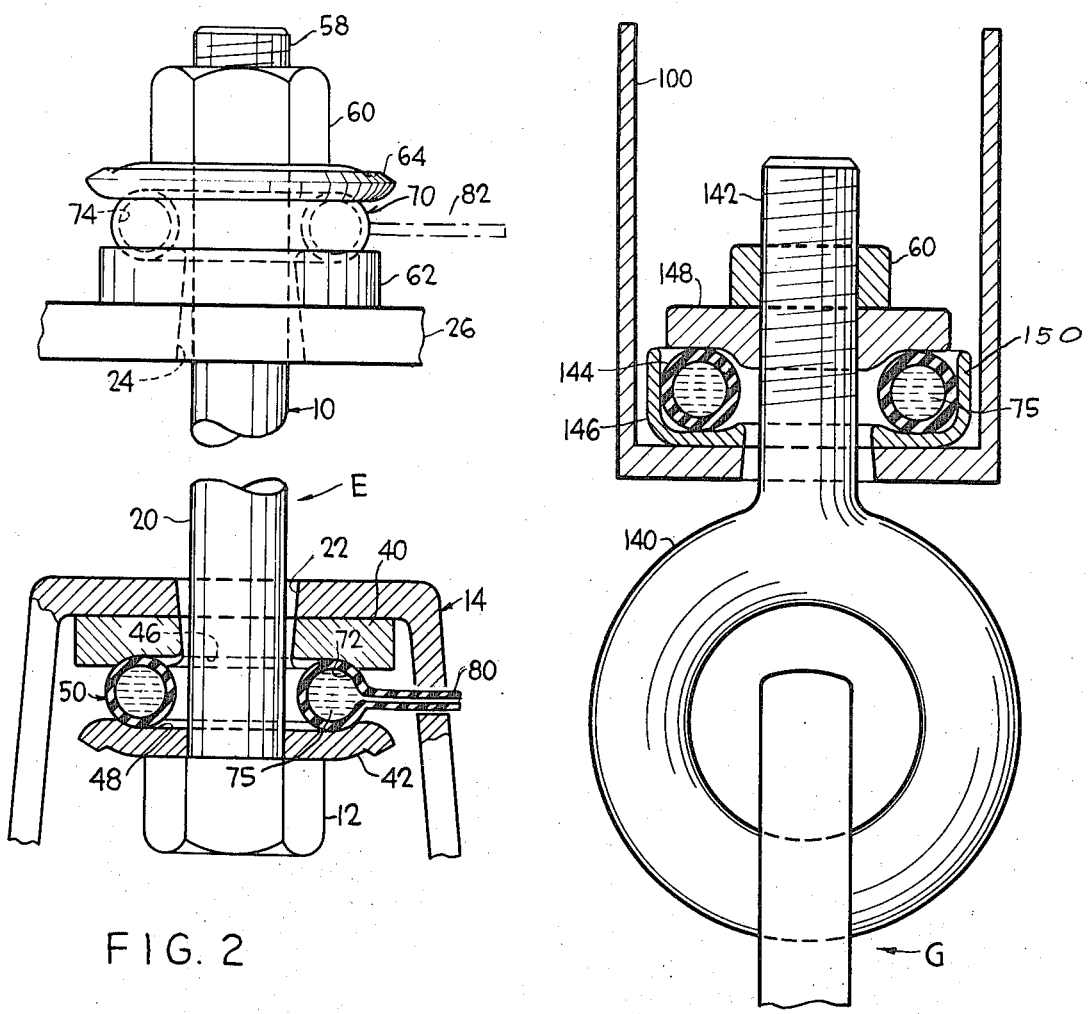
FIG. 2
FIG. 4
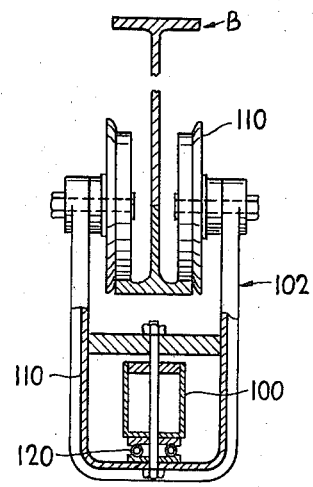
FIG. 3

3,809,382

FLUID THRUST DEVICE

BACKGROUND OF THE INVENTION

1. Field of Invention

The invention relates to thrust devices comprising a resilient, flexible closed vessel or container filled with liquid.

2. Description of the Prior Art

Fluid thrust members commonly called air springs are known but such devices are not suitable for many thrust applications because of the high compressibility characteristics of air.

SUMMARY OF THE INVENTION

The invention provides a novel and improved thrust article comprising a resilient, flexible, closed vessel or container, which may be ring-like in configuration, if desired, filled with fluid, preferably a gelatinous material or a liquid.

The invention further provides a novel and improved overhead material handling apparatus incorporating many features, safety and otherwise, not present in similar prior art apparatus.

BRIEF DESCRIPTION OF THE DRAWINGS

FIG. 2 is an enlarged view, with parts in section, of a portion of FIG. 1;

FIG. 3 is an enlarged sectional view, with parts in elevation, approximately on the line 3—3 of FIG. 1; and FIG. 4 is an enlarged sectional view, with parts in elevation, approximately on the line 4—4 of FIG. 1.

DESCRIPTION OF A PREFERRED EMBODIMENT

Figure 1:
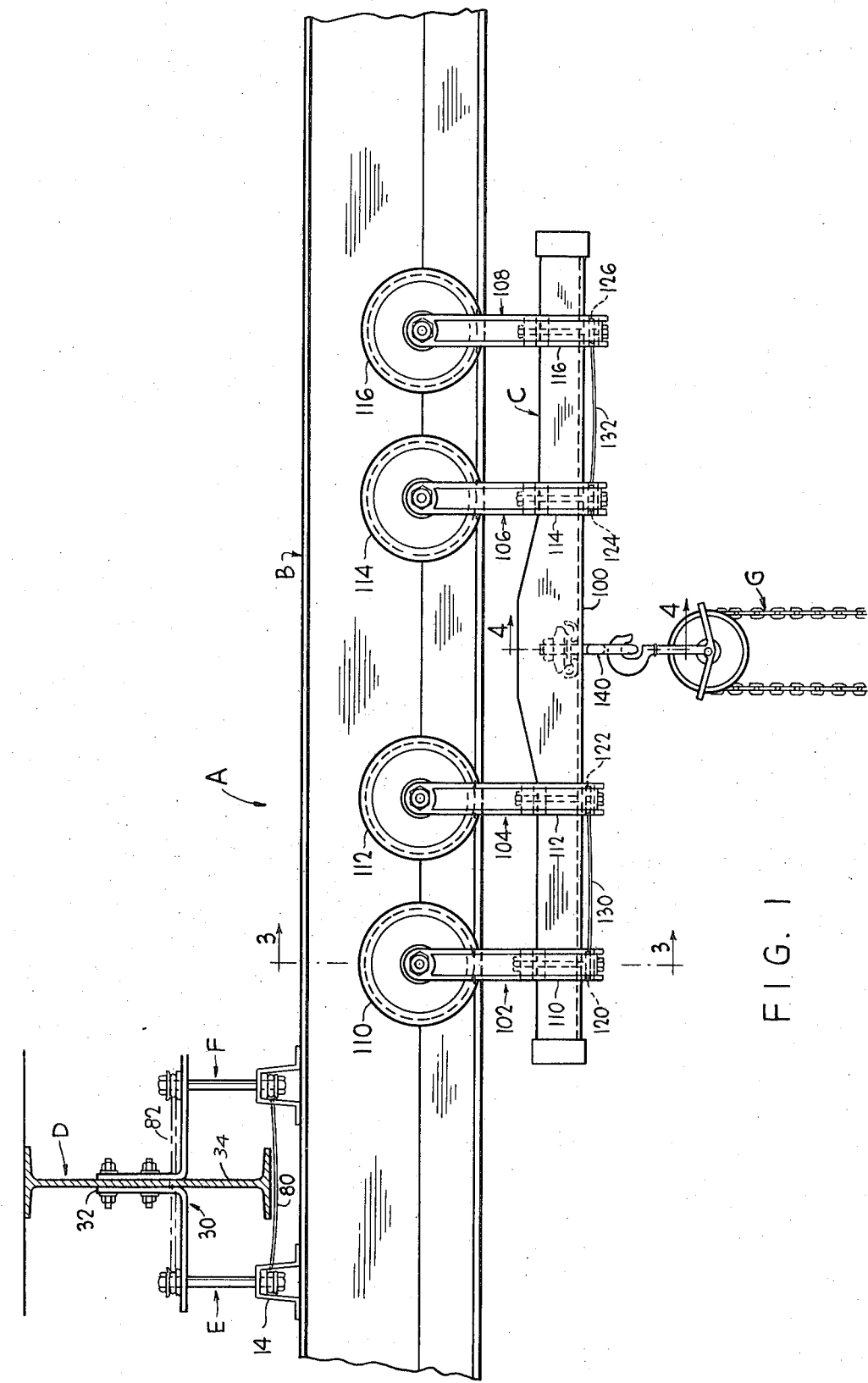
FIG. 1 is a fragmentary view of an overhead monorail carrier system embodying the present invention.

Referring to the drawings, the reference character A designates generally an overhead, monorail, material handling system comprising an I-shaped overhead monorail B along which a trolley C is movable. The rail B is suspended from an overhead support D such as an I-beam girder of a building by suspension supports E, F.

The suspension supports E, F, illustrated, are duplicates of one another and only the support E is shown and described in detail. Where corresponding parts of the support F are identified and/or referred to, the same reference character is employed as for the support E, but having a prime mark applied thereto.

The support E comprises a hanger member in the form of a bolt 10 having its head 12 located within a channel-shaped bracket 14 suitably secured to the upper flange 16 of the rail B and its shank 20 projecting upwardly through a suitable aperture 22 in the bracket 14 and through a similar aperture 24 in a horizontal flange 26 of an angle bracket 30, the vertical flange 32 of which is secured, as by bolts, to the web of the I-beam 34 of the overhead support D. Two spaced devices, for example washers 40, 42 are positioned on the shank 20 of the bolt 10 between the web of the bracket 14 and the bearing surface of the head 12 of the bolt. The facing sides or surfaces of the washers 40, 42 have annular depressions 46, 48 therein, respectively, for the location and centering of a resilient, flexible, ring-like closed container or vessel member 50 having liquid therein interposed therebetween. The depressions 46, 48 in the washers 40, 42 form abutment surfaces at least partially surrounding the container 50. The upper threaded end 58 of the shank of the bolt 10 is provided with a nut 60 threaded thereon and interposed between the bearing face of the nut and the upper surface of the horizontal flange 26 of the bracket 30 are washers 62, 64 similar in construction to the washers 40, 42, respectively. A resilient, flexible, closed vessel 70, similar to the vessel 50, is interposed between the recessed facing sides of the washers 62, 64. The I-beam 34, bracket 30 and washer 62 form the overhead support member for the supported rail member or assembly including the rail B, bracket 14 and washer 40. The apertures in the bracket 14, bracket flange 26 and washers 40, 62 are larger than the shank of the bolt extending therethrough as are the apertures in the resilient members 50, 70. The resilient, flexible members 50, 70 shown are ring-like in configuration and are hollow, that is, they have ring-like closed chambers 72, 74 in the interior thereof. These chambers are filled with an incompressible fluid, preferably a liquid 75.

The construction is such that the load of the rail B and any trolleys traveling therealong is transferred to the overhead support D through the members 50, 70. The members 50, 70 being flexible and resilient, and with the clearance between the shank 20 of the bolt 10 and the apertures 22 in the bracket 14 and washer 40 and the apertures 24 in the flange 26 of the bracket 30 and washer 62 provide limited universal movement of the washers 42, 64 relative to the washers 40, 62, respectively, thus permitting the bolt 10 to self-center and transmit the load vertically and reduces any tendency to bend the bolt. The members 50, 70 also distribute the load equally or uniformly about the head of the bolt and the nut and reduce the transmission of vibrations and sound between the rail and the overhead supporting structure, and in turn shock loading of the bolt 10, bracket 30 and building structure due to travel of carriers along the rail, thus extending the fatigue life of the bolt, etc.

In applications where a plurality of closely positioned supports are employed, the closed container or vessel members, preferably, are filled with liquid and interconnected by a conduit so that the liquid can flow from one to another. In the embodiment illustrated the interior chambers 72, 72' of the members 50, 50' are connected by a conduit 80 so that fluid in the chambers 72, 72' can flow back and forth from one chamber to the other. The interior chambers 74, 74' of the members 70, 70' are similarly connected by a conduit 82 extending through a suitable opening in the overhead support D. The connections 80, 82 equalize, between the two bolts of the supports, the weight of the rail, etc. thereon and in the members 50,50'. This reduces shock loading of the bolts caused by rail deflection incident to the movement of a trolley therealong, results in low impart transfer of the load from one support to the other in the event one support fails, and provides a rail leveling function as the rail is subjected to changing load conditions, etc.

The carrier-type trolley C, illustrated, comprises a load bar 100 carried by a plurality of trucks 102, 104, 106, 108, respectively. The distal end of the truck frame members are provided with wheels which engage and travel along parts of the lower flange of the I-shaped rail B at opposite sides of the web of the rail. The load bar 100 is supported in the truck frame members by resilient, flexible ring-like members 120, 122, 124, 126 similar to the members 50, 70, previously described, with suitable washers at opposite ends thereof. The load bar shown is channel shaped in cross section and a single resilient member is interposed between the underside of a web of the load bar and the horizontal part of the frame of the truck therebelow. In the trolley illustrated the four trucks are arranged in pairs adjacent to opposite ends of the load bar and the interior chambers of the members 120, 122 and 124, 126 at opposite ends of the trolley are connected to one another by conduit means 130, 132, respectively. Washers similar to the washers 40, 62, previously referred to, are employed at opposite ends of the members 120, 122, 124, 126 between the lower side of the load bar 100 and the upper side of the truck frame. The construction is simple, inexpensive and reliable and distributes the load equally between the trucks.

The trolley C, shown, has a load grab or support G attached to the load bar 100 midway between its ends by an I-bolt 140 having a threaded shank 142 extending upwardly through the load bar which is connected to the load bar through a member 144 similar to the members 50, 70 so as to reduce and/or eliminate the transmission of vibrations, shock load, etc., between the load grab and the load bar.

The washers or washer-like members 146, 148 located at opposite ends of the liquid filled container 144 are so constructed that they substantially enclose the member 144. For this purpose the lower member 146 includes an upwardly projecting skirt or annular flange 150 extending adjacent to or, if desired, slightly above the lower surface of the member 148. The flange 150 provides an abutment surface surrounding the exterior of the container 144. The enclosing or partially enclosing of the member 144 permits the members to be made smaller and/or constructed with side walls of less tensil strength and greater resiliency and flexability for any given design load than would otherwise be the case. The apertures in the load bar 100 and the washer 146 through which the shank of the I-bolt 140 project are larger than the shank of the I-bolt thus permitting the I-bolt to center itself in the load bar and have limited universal movement with respect thereto.

The liquid filled vessel members need not necessarily be ring-like in configuration but may be of any suitable shape, for example, cubical, and if ring-like they need not be circular. The preferred configuration, however, is one which provides end surfaces for engagement by the oppositely facing abutment surfaces of the members between which they are employed. The extent to which the liquid filled vessel members are compressed by any given load will be a function of their size, wall thickness, and the tensil strength and elasticity of the material of which they are made, etc. Obviously the liquid filled vessel or container members must be of a construction such that the load to which they are subject will not compress them sufficient to allow facing surfaces of the washers or other members engaging opposite ends thereof to contact one another. Where the liquid filled closed container members are of ring-like configuration their transverse cross-sectional configuration may be of any suitable shape. Because of the flexibility and resiliency of the closed vessel or container member and the liquid therein, the force or thrust transmitted thereby from one member engaged therewith to another at the opposite end will be uniformly distributed throughout the members.

As a further feature of the present invention, rupture of a liquid filled thrust member of the character herein disclosed can be quickly detected and identified by filling the members with colored liquid which will be conspicuous as it runs or drips over equipment and/or objects therebelow.

From the foregoing description of preferred embodiments of the invention it will be apparent that the objects and advantages of the invention heretofore mentioned and others have been accomplished and that there has been provided a novel and improved thrust device and an overhead material handling apparatus which has many features, safety and otherwise, not incorporated in prior apparatuses.

While certain embodiments of the invention have been illustrated, described and referred to, as previously mentioned, the invention may be otherwise embodied, and while a single closed vessel or container member filled with liquid has been employed between the spaced abutment surfaces of the different support and supported members shown, it will be obvious that any number of such members may be employed, stacked one upon another, connected by conduit means, as desired.

Having thus described my invention, what I claim is:

1. A support assembly comprising: a support member having an opening therethrough; a supported member having an opening therethrough beneath the opening through said support member; a rod-like member extending through said openings; means connected to said rod-like member providing abutment surfaces facing in the direction of one another and at the opposite sides of said support and supported members from one another; and a discrete, entirely resilient and flexible, ring-like member having a ring-like closed chamber having liquid therein interposed between one of said support and supported members and the said abutment surface adjacent thereto.

2. A support assembly as claimed in claim 1 wherein the flexible ring-like member is entirely surrounded by an abutment surface.

3. A support assembly comprising: a support member having an opening therethrough; a supported member having an opening therethrough beneath the opening through said support member; a rod-like member extending through said openings; means connected to said rod-like member providing abutment surfaces facing in the direction of one another and the opposite sides of said support and supported members from one another; and a discrete, entirely resilient and flexible, ring-like member having a ring-like interior closed chamber having liquid therein between said support and supported members and the said abutment surfaces adjacent thereto.

4. A support assembly as claimed in claim 3 wherein said ring-like members are entirely surrounded by abutment surfaces.

5. A support assembly comprising: a support member having two side-by-side openings therethrough; a supported member having two side-by-side openings therethrough one beneath each of the openings through said support member; side-by-side rod-like members extending through said side-by-side openings in said support and supported members; means connected to said rod-like members providing abutment surfaces surrounding the respective rod-like members facing in the direction of one another and at opposite sides of said support and supported members from one another; and discrete, entirely resilient and flexible, ring-like members each having a ring-like interior closed chamber connected by a conduit and having liquid therein between one of said support and supported members and the said abutment surfaces adjacent thereto.

6. A support assembly as claimed in claim 5 wherein said ring-like members are entirely surrounded by abutment surfaces.

7. A support assembly comprising: a support member and a supported member providing abutment surfaces facing in the direction of one another; a discrete, entirely resilient and flexible vessel member having liquid therein interposed between said abutment surfaces; and means providing an abutment surface entirely surrounding said vessel member.

* * * * *

UNITED STATES PATENT OFFICE
CERTIFICATE OF CORRECTION

Patent No. 3,809,382　　　　　　　　Dated May 17, 1974

Inventor(s) Karl A. Pamer

It is certified that error appears in the above-identified patent and that said Letters Patent are hereby corrected as shown below:

Column 2, line 9, cancel "interposed" and substitute --positioned--;
Column 2, line 50, cancel "are" and substitute --may be--;
Column 2, line 52, cancel "The" and substitute --Either of the--;
Column 3, line 5, cancel "interposed" and substitute --positioned--;
Column 4, line 38, after "ring-like", second occurrence, insert --interior--;
Column 4, line 39, cancel "interposed";
Column 4, line 44, before the period, insert --whereby expansion of said member is limited--;
Column 4, line 60, before the period, insert --whereby expansion of said members is limited--;
Column 5, line 4, cancel "and", second occurrence;
Column 5, line 7, delete "connected by a conduit and having liquid therein";
Column 5, line 8, delete "one of";
Column 5, line 9, before the period, insert --; and a conduit connecting said closed chambers of two of said ring-like members surrounding different of said rod-like members, said chambers and said conduit having liquid therein--;
Column 6, line 2, before the period insert --whereby expansion of said members is limited--;
Column 6, line 7, cancel "interposed";
Column 6, line 9, before the period insert --whereby expansion of said member is limited--.

Signed and sealed this 29th day of October 1974.

(SEAL)
Attest:

McCOY M. GIBSON JR.
Attesting Officer

C. MARSHALL DANN
Commissioner of Patents